United States Patent
Wang

(10) Patent No.: US 8,537,709 B2
(45) Date of Patent: Sep. 17, 2013

(54) NETWORK DEVICE, AND MULTI-WIDE AREA NETWORK INTERFACE SELECTION MODULE AND METHOD

(75) Inventor: Pei-Yu Wang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 13/087,391

(22) Filed: Apr. 15, 2011

(65) Prior Publication Data

US 2012/0236739 A1 Sep. 20, 2012

(30) Foreign Application Priority Data

Mar. 14, 2011 (CN) .......................... 2011 1 0060356

(51) Int. Cl.
*H04L 12/26* (2006.01)
(52) U.S. Cl.
USPC .................. 370/252; 370/395.31; 370/395.41
(58) Field of Classification Search
USPC .......... 370/229, 230, 252, 253; 709/223–226
See application file for complete search history.

(56) References Cited

U.S. PATENT DOCUMENTS

| | | | |
|---|---|---|---|
| 6,349,098 B1 * | 2/2002 | Parruck et al. ............. | 370/395.6 |
| 2004/0165597 A1 * | 8/2004 | Bicknell et al. .......... | 370/395.31 |
| 2010/0150102 A1 * | 6/2010 | Li et al. ......................... | 370/331 |
| 2012/0213126 A1 * | 8/2012 | Danzeisen et al. ............ | 370/255 |

* cited by examiner

*Primary Examiner* — Gary Mui
(74) *Attorney, Agent, or Firm* — Altis Law Group, Inc.

(57) ABSTRACT

A network device includes a plurality of wide area network (WAN) interfaces, and a multi-WAN interface selection module. The WAN interfaces transmit session requests. The multi-WAN interface selection module communicates with the WAN interfaces and includes a monitoring unit, a quality table management unit and a network selection unit. The monitoring unit monitors and records network QoS corresponding to each WAN interface to obtain corresponding QoS information. The quality table management unit establishes a QoS information table according to the QoS information from the monitoring unit and updates the QoS information table in real time, and the network selection unit queries the QoS information table to select and distribute a WAN interface to send a new session request.

16 Claims, 3 Drawing Sheets

NETWORK DEVICE, AND MULTI-WIDE AREA NETWORK INTERFACE SELECTION MODULE AND METHOD

BACKGROUND

1. Technical Field

The disclosure generally relates to network communication, and more particularly to a network device, and multi-wide area network (WAN) interface selection module and method.

2. Description of the Related Art

Network devices, such as gateways and routers, are typically connected to two or more data lines to access different networks to achieve bandwidth distribution. Thus, one or more WAN interfaces are dynamically distributed for users by detecting usage ratio of the bandwidth and busy condition of the WAN interfaces. The distribution method generally includes round robin scheduling or weight round robin (WRR) scheduling. However, even through the busy condition can be determined via the detection method, it is difficult to determine whether the WAN interfaces work normally or not. Thus, the data or data packets cannot pass across the WAN interfaces, resulting in communication failure and data traffic.

Therefore, there is room for improvement within the art.

BRIEF DESCRIPTION OF THE DRAWINGS

Many aspects of an exemplary network device, and multi-wide area network interface selection module and method can be better understood with reference to the following drawings. The components in the drawings are not necessarily drawn to scale, the emphasis instead being placed upon clearly illustrating the principles of the exemplary network device, and multi-wide area network interface selection module and method. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
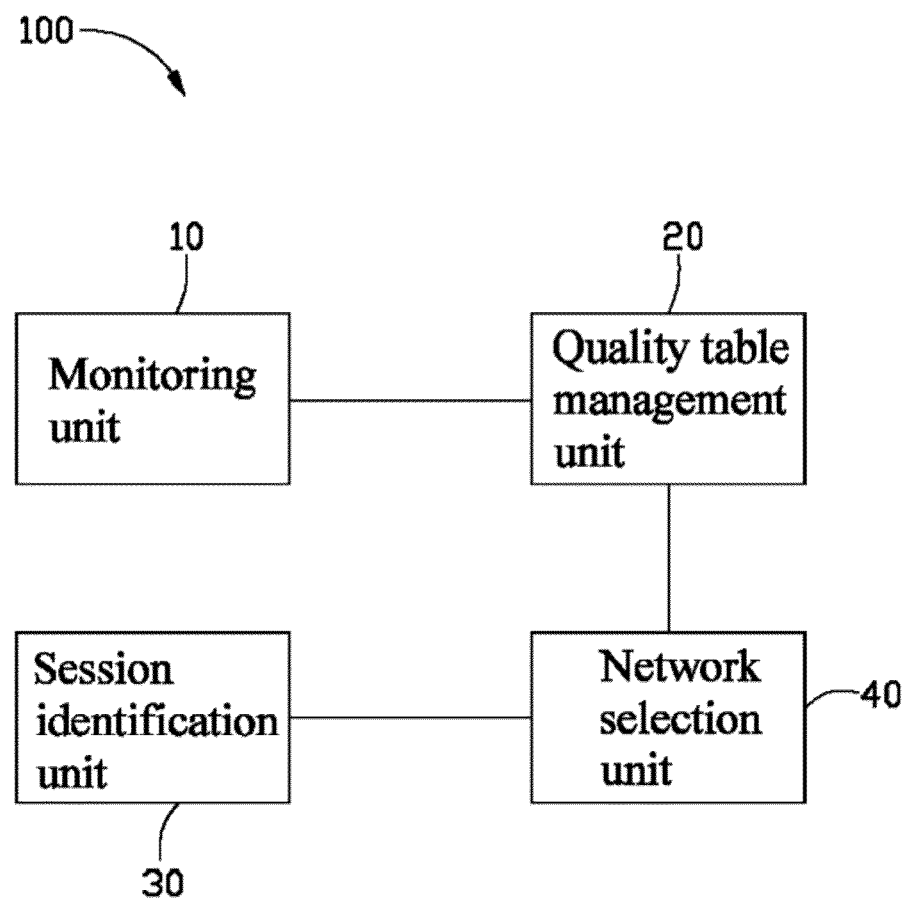
FIG. 1 is a block diagram of a multi-wide area network (WAN) interface selection module, according to an exemplary embodiment of the disclosure.
Figure 2:
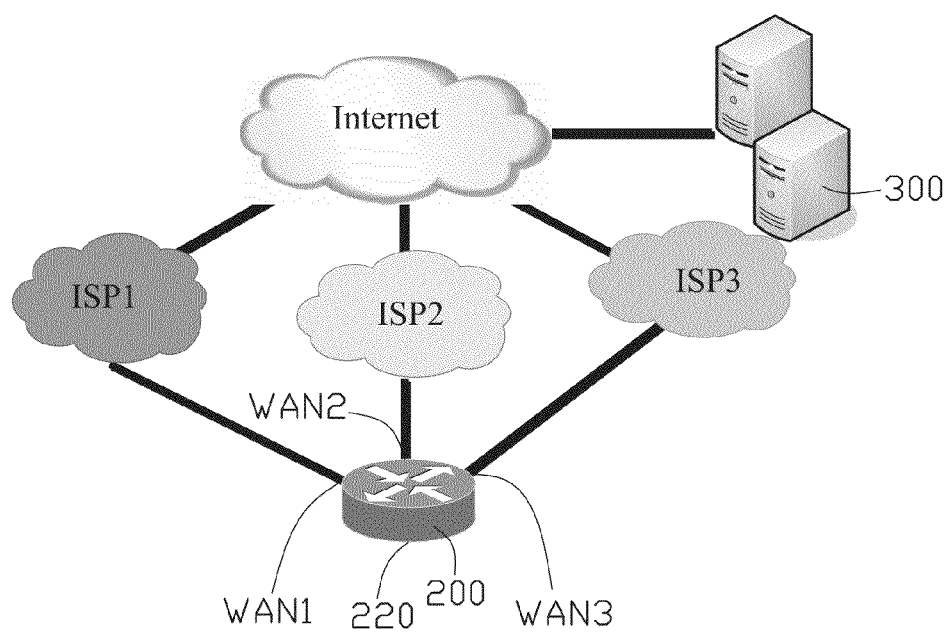
FIG. 2 is a schematic view of a network device communicating with a sever, according to an exemplary embodiment of the disclosure.

FIG. 1 is a block diagram of a multi-wide area network (WAN) interface selection module 100, according to an exemplary embodiment of the disclosure. The multi-WAN interface selection module 100 can be employed and integrated within a network device 200 (as shown in FIG. 2), such as a router or gateway. It should be understood that "interface" is defined to be a hardware circuitry or associated circuitry or mechanical components of a connection/port that electronically connects the network device 200 to other device(s).

Also referring to FIG. 2, the network device 200 includes at least one local area network (LAN) interface 220 and a plurality of WAN interfaces. In this exemplary embodiment, the at least one LAN interface 220 is in electronic communication with a computer. The WAN interfaces include WAN1, WAN2 and WAN3, and the three WAN interfaces WAN1, WAN2 and WAN3 are respectively in electronic communication with Internet service provider1 (ISP1), ISP2 and ISP 3 through different networks. The ISP1, ISP2 and ISP3 provide access to the Internet for a server 300.

The multi-WAN selection system 100 is capable of receiving a session request from a communicating device such as a computer, and dynamically distributing WAN interfaces of the network device 200 according to actual operating state of the network corresponding to the WAN interfaces, to feedback and transmit the session request to the server 300. In this exemplary embodiment, a session, in particular networking, is a semi-permanent interactive information interchange, also know as a dialogue, a conversation or a meeting, between two or more communicating devices, or between a computer and user. For example, a communication session may be implemented as part of protocols and services at the application layer, at the session layer or at transport layer in the open system interconnect (OSI) system, such as a hyper text transfer protocol (HTTP) session or a transfer control protocol (TCP) session.

The multi-WAN selection system 100 includes a monitoring unit 10, a quality table management unit 20, a session identification unit 30, and a network selection unit 40. The monitoring unit 10, the quality table management unit 20, the network selection unit 40, and the session identification unit 30 are in electronic communication in series. These modules 10-40 may comprise one or more computerized code stored in a storage system and executed by a processor of the network device 200.

The monitoring unit 10 is capable of monitoring and recording the quality of network service (QoS) corresponding each WAN interface of the network device 200 to obtain QoS information. It should be understood that QoS is the ability to provide different priority to different applications, users, or data flows, to guarantee a certain level of performance to a data flow. In this exemplary embodiment, the QoS information includes bandwidth of data transmission, transmission delay, and packet loss rate of data. Thus, the monitoring unit 10 transmits the QoS information the quality table management unit 20.

The quality table management unit 20 is capable of receiving the QoS information and generating a QoS information table according to the QoS information and updating the QoS information table in real time. In this exemplary embodiment, the QoS information table includes different parameter such as internet protocol (IP) addresses of the corresponding WAN interfaces, connection states of each WAN interface, and QoS scores. The QoS scores can be obtained and calculated according to the weighted average of the transmission bandwidth, transmission delay, data packet loss rate and other parameters. The QoS score is in direct proportion to the communication quality of the network.

The session identification unit 30 prestores different session requests corresponding different network QoS, such as real-time transport protocol (RTP). In this exemplary embodiment, the session identification unit 30 is capable of identifying a new session request such as file transfer protocol (FTP) from a host or a network and determining whether the new session request is consistent with the prestored session request or not. When the new session request is inconsistent with the prestored session request, the session identification unit 30 triggers and sends a first command signal to the network selection unit 40. When the new session request is consistent with the prestored session request, the session identification unit 30 provides and transmits a second command signal to the network selection unit 40.

The network selection unit 40 is capable of receiving the first command signal or the second command signal from the session identification unit 30, and selecting and dynamically distributing WAN interfaces for the session requests to communicate with the server 300 through different networks.

For example, in this exemplary embodiment, when the network selection unit 40 receives the first command signal from the session identification unit 30, the network selection unit 40 dynamically selects and distributes a WAN interface of the network device 200, such as WAN2, to transmit the new session request. When the network selection unit 40 receives the second command signal from the session identification unit 30, the network selection unit 40 accesses and queries the QoS information table built-in the quality table management unit 20, and selects the WAN interface with the highest QoS score, such as WAN1, to establish communication with corresponding ISP.

Similarly, when the QoS score of each WAN interface of the network device 200 is changed in real time, the network selection unit 40 may automatically re-query the QoS information table, and dynamically reselect a new WAN interface with highest QoS score to establish communication with corresponding ISP.

Figure 3:
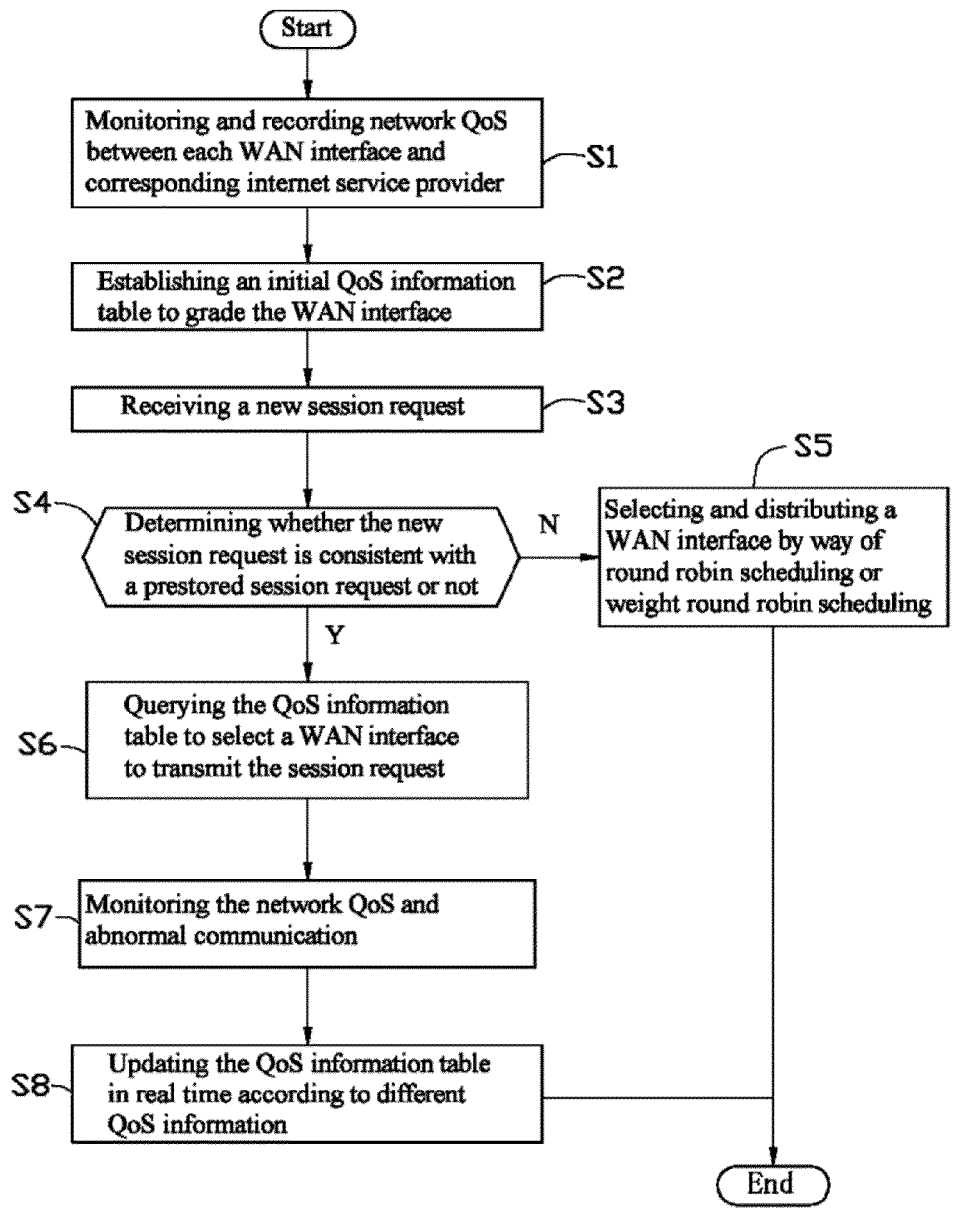
FIG. 3 is a flowchart illustrating a method for selecting multi-WAN interface, according to an exemplary embodiment of the disclosure.

Referring to FIG. 3, a method for selecting multi-WAN interface in accordance with an exemplary embodiment of the disclosure is depicted. The selecting method can use the aforementioned multi-WAN interface selection module 100 and may at least include the following steps.

In step S1, the monitoring unit 10 monitors and records network QoS between each WAN interface of the network device 200 and corresponding ISP, such as WAN1 and ISP1, WAN2 and ISP2, WAN3 and ISP3, to obtain QoS information, and the obtained QoS information is transmitted to the quality table management unit 20.

In step S2, the quality table management unit 20 receives the QoS information and generates an initial QoS information table. For example, referring to table 1, the QoS score of the WAN1, WAN2 and WAN3 are respectively 7, 5 and 1, which represents that the network between the WAN1 and ISP1 has the best communication quality.

TABLE 1 an initial QoS information table corresponding each WAN interface

| WAN interface | IP address | connection state | QoS score |
|---|---|---|---|
| WAN1 | 30.1.1.x | connected | 7 |
| WAN2 | 30.1.1.x | connected | 5 |
| WAN3 | 30.1.1.x | connected | 1 |

In step S3, the network device 200 receives a new session request through the LAN interface 220.

In step S4, the session identification unit 30 determines whether the new session request is consistent with a prestored session request in the session identification unit 30 or not. If the new session request is inconsistent with the prestored session request, the session identification unit 30 triggers and sends a first command signal to the network selection unit 40, then go to step S5. If the new session request is consistent with the prestored session request, the session identification unit 30 provides and transmits a second command signal to the network selection unit 40, then goes to step S6.

In step S5, the network selection unit 40 dynamically selects and distributes a WAN interface, such as WAN2, to transmit the new session request by way of round robin scheduling or weight round robin (WRR) scheduling. Thus, the new session request is transmitted to the Internet through the WAN2 and the ISP2.

In step S6, the network selection unit 40 receives the second command signal from the session identification unit 30, and accesses and queries the QoS information table of the quality table management unit 20 to select the WAN interface with the highest QoS score. In this exemplary embodiment, the WAN1 is selected, so the new session request is transmitted to the Internet through the WAN1 and the ISP1 to establish communication with the Internet.

In step S7, the monitoring unit 10 continues to monitor and record the network QoS of the WAN interface that has established communication with the Internet, and monitors different abnormal cases, such as data delay, network disconnection.

In step S8, the quality table management unit 20 updates the QoS information table in real time according to the QoS information from the monitoring unit 10 to adjust the QoS score of the corresponding WAN interface. In this exemplary embodiment, if the network between the WAN1 and the ISP1 has a good communication, the QoS score of the WAN1 is increased to 8. If the network between the WAN1 and the ISP1 has poor communication, the QoS score of the WAN1 is reduced to 4, and another WAN interface with highest QoS score is selected for the next communication.

Additionally, the QoS scores can also be predetermined based on theory and experience, but not limited to the calculation according to the weighted average of the transmission bandwidth, transmission delay, data packet loss rate, and other parameters.

In summary, in the multi-WAN interface selection module 100 of the exemplary embodiment, the quality table management unit 20 generates a QoS information table including different QoS information from the monitoring unit 10. Thus, the multi-WAN interface selection module 100 can dynamically select WAN interface by querying QoS score corresponding to each WAN interface in the QoS information table to transmit the session requests. The multi-WAN interface selection module 100 can accurately select and obtain a preferable WAN network to transmit data or data packets, which can improve communication quality and utilization of network resource.

In the present specification and claims the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A method for selecting wide area network (WAN) interfaces of a network device, the method comprising:
    establishing an initial quality of service (QoS) information table to grade the WAN interfaces of the network device;
    receiving a new session request; and
    determining whether the new session request is consistent with a prestored session request or not;

querying the QoS information table to select a WAN interface to transmit the session request if the new session request is consistent with the prestored session request; and selecting and distributing a WAN interface of the network device by way of round robin scheduling or weight round robin scheduling if the new session request is inconsistent with the prestored session request.

2. The method as claimed in claim 1, further comprising monitoring and recording network QoS between each WAN interface of the network device and corresponding internet service provider (ISP).

3. The method as claimed in claim 2, further comprising monitoring the network QoS and abnormal communication.

4. The method as claimed in claim 1, further comprising updating the QoS information table according to different QoS information.

5. A network device comprising a multi-wide area network (WAN) interface selection module used for selecting WAN interfaces of the network device, the multi-WAN interface module comprising:
   a monitoring unit that monitors and records network QoS corresponding to each WAN interface to obtain corresponding QoS information;
   a quality table management unit that electrically connects the monitoring unit to receive the QoS information;
   a network selection unit that electrically connects the quality table management unit, wherein the quality table management unit generates a QoS information table and updates the QoS information table according to the QoS information, and the network selection unit queries the QoS information table to select and distribute a WAN interface to send a session request; and
   a session identification unit that electrically connected to the network selection unit, wherein the session identification unit prestores different session requests and determining a new session request is consistent with the prestored session request or not, the network selection unit dynamically selects and distributes a WAN interface to transmit the new session request if the new session request is inconsistent with the prestored session request; the network selection unit accesses and queries the QoS information table, and selects a WAN interface to establish communication with corresponding internet service provider (ISP) if the new session request is consistent with the prestored session request.

6. The network device as claimed in claim 5, wherein if the new session request is inconsistent with the prestored session request, the session identification unit triggers and sends a first command signal to the network selection unit, if the new session request is consistent with the prestored session request, the session identification unit provides and transmits a second command signal to the network selection unit.

7. The network device as claimed in claim 6, wherein when the network selection unit receives the first command signal from the session identification unit, the network selection unit dynamically selects and distributes a WAN interface to transmit the new session request; when the network selection unit receives the second command signal from the session identification unit, the network selection unit accesses and queries the QoS information table, and selects a WAN interface to establish communication with corresponding ISP.

8. The network device as claimed in claim 5, wherein the QoS is the ability to provide different priority to different applications, users, or data flows, to guarantee a certain level of performance to a data flow, and the QoS information comprises bandwidth of data transmission, transmission delay, and packet loss rate of data.

9. The network device as claimed in claim 5, wherein the QoS information table comprises internet protocol (IP) addresses of the corresponding WAN interfaces, connection states of each WAN interface, QoS scores and other parameters.

10. The network device as claimed in claim 9, wherein the QoS scores is obtained and calculated according to the weighted average of the transmission bandwidth, transmission delay and data packet loss rate, and the QoS score is in direct proportion to the communication quality of the network.

11. The network device as claimed in claim 10, wherein when the QoS score of each WAN interface is changed in real time, the network selection unit automatically re-queries the QoS information table, and dynamically reselects a new WAN interface to establish communication with corresponding ISP.

12. A network device, comprising:
   a plurality of WAN interfaces that transmit session requests; and
   a multi-WAN interface selection module that is electronic communication with the WAN interfaces, the multi-WAN interface selection module comprising:
   a monitoring unit that monitors and records network QoS corresponding to each WAN interface to obtain corresponding QoS information;
   a quality table management unit that electrically connects the monitoring unit;
   a network selection unit that is electrically communication with the quality table management unit and the WAN interfaces, wherein the quality table management unit establishes a QoS information table according to the QoS information from the monitoring unit and updates the QoS information table in real time, and the network selection unit queries the QoS information table to select and distribute a WAN interface to send a new session request; and
   a session identification unit that electrically connected to the network selection unit, wherein the session identification unit prestores different session requests and determining a new session request is consistent with the prestored session request or not, the network selection unit dynamically selects and distributes a WAN interface to transmit the new session request if the new session request is inconsistent with the prestored session request; the network selection unit accesses and queries the QoS information table, and selects a WAN interface to establish communication with corresponding internet service provider (ISP) if the new session request is consistent with the prestored session request.

13. The network device as claimed in claim 12, further comprising at least one local area network (LAN) interface, wherein LAN interfaces are in electronic communication with a computer, each WAN interfaces is respectively in electronic communication with an ISP, and the ISP access to the Internet for a server.

14. The network device as claimed in claim 12, wherein if the new session request is inconsistent with the prestored session request, the session identification unit triggers and sends a first command signal to the network selection unit, if the new session request is consistent with the prestored session request, the session identification unit provides and transmits a second command signal to the network selection unit.

15. The network device as claimed in claim 14, wherein when the network selection unit receives the first command signal from the session identification unit, the network selection unit dynamically selects and distributes a WAN interface to transmit the new session request; when the network selection unit receives the second command signal from the session identification unit, the network selection unit accesses and queries the QoS information table, and selects a WAN interface to establish communication with corresponding ISP.

16. The network devices claimed in claim 12, wherein the QoS information table comprises internet protocol (IP) addresses of the corresponding WAN interfaces, connection states of each WAN interface, QoS scores and other parameters, and the QoS scores is obtained and calculated according to the weighted average of the transmission bandwidth, transmission delay and data packet loss rate, and the QoS score is in direct proportion to the communication quality of the network.

\* \* \* \* \*